Sept. 18, 1951 P. W. MARTIN 2,568,241
APPARATUS FOR LOGGING
Filed Nov. 8, 1944 3 Sheets-Sheet 3

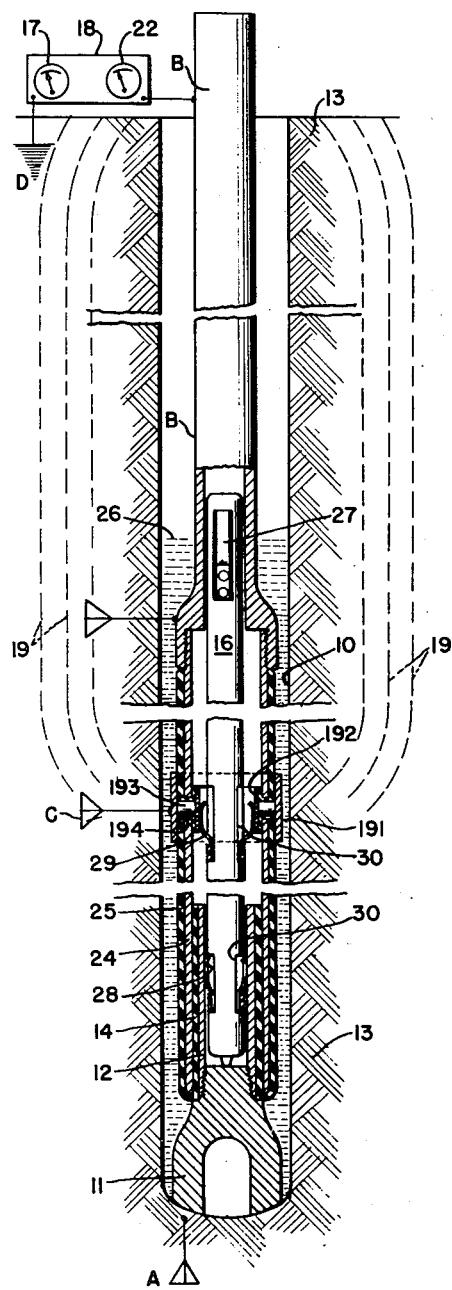
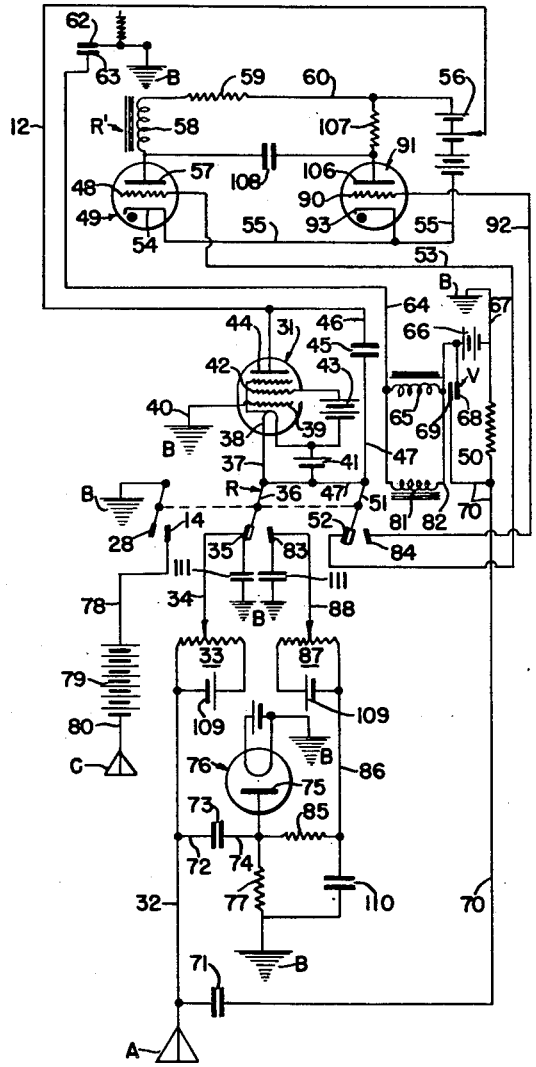

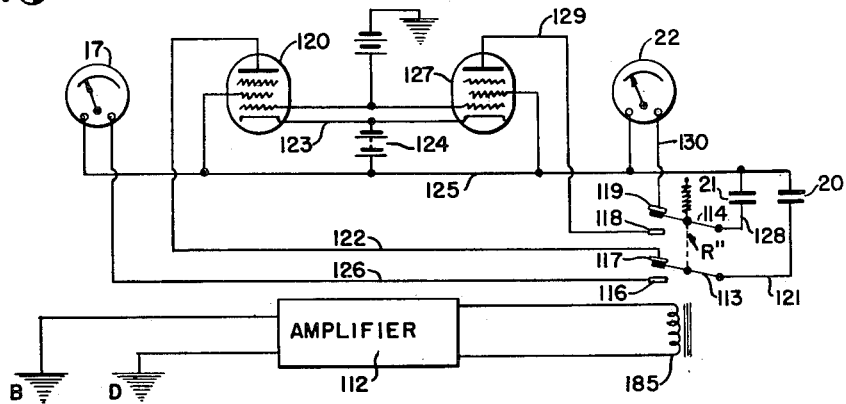
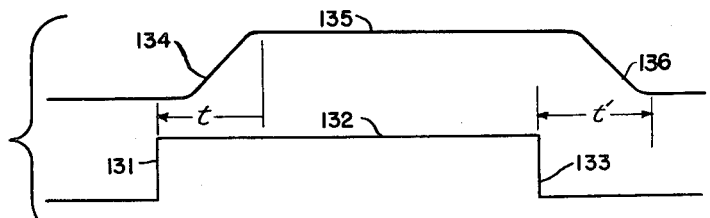
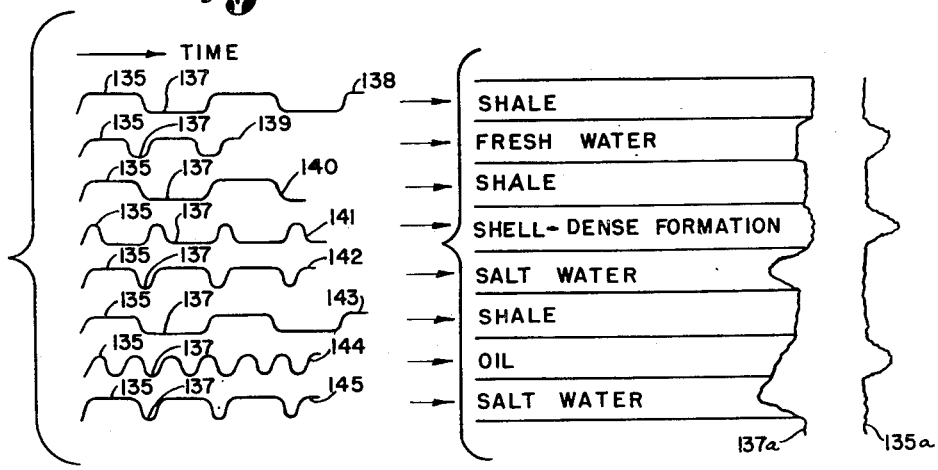

Inventor
PHILIP W. MARTIN
By
Attorney

Patented Sept. 18, 1951

2,568,241

UNITED STATES PATENT OFFICE 2,568,241

APPARATUS FOR LOGGING

Philip W. Martin, Huntington Park, Calif.

Application November 8, 1944, Serial No. 562,502

1 Claim. (Cl. 177—351)

This invention relates to a method and apparatus for producing at the surface of the earth a record or indication of variations in structure existing in a subsurface strata, and is particularly applicable to the logging of deep wells such as oil wells. The primary object of the invention is to provide an improved method and apparatus for logging the conditions and material existing in the various strata traversed by a well in the earth.

The invention may be used in the recording of resistivity, self-potential, temperature, pressure, radio-activity, directional deviation of a drill hole, etc.

In the past it has been considered necessary in connection with successful methods of well logging to employ long wires or cables to transmit to the surface from the bottom of the hole information which is picked up by exploring devices at the bottom of the hole. It also has been customary to make the log after the hole is drilled. Under such conditions the penetration of drilling mud and water into the formations traversed by the hole greatly reduces the sharpness of definition of the conditions originally existing in the formation and introduces undesirable variations of such conditions. Consequently, the log thus produced gives an indication of the conditions existing after the penetration of the mud and water, but does not give a true indication of the conditions existing originally in the formation. It is therefore extremely desirable to produce the log during the drilling operation. Prior attempts to log during the drilling operation have been attended with such difficulties as the necessity of measuring the average of a great length of drill hole, making it impossible to achieve a sharp definition of conditions existing within thin strata such as, for example, oil sands which very often run as little as a few inches in thickness. Prior attempts to produce a log without the use of an insulating conductor extending from the surface down to the point of drilling have failed because of the attempt to use a high frequency transmitting wave. I have discovered that high frequency electrical impulses are suppressed by the earth's suppression value in the great distances that are required to be traversed between the bottom of a deep well and the surface.

Having in mind these inadequacies in the prior methods, my invention provides a method utilizing the transmission, from the bottom of a deep well to the surface of the earth, of electrical impulses having a frequency below the suppression value of the earth between the bottom of the well and the surface, and thereby capable of reaching the surface of the earth and being there recorded.

A further object of the invention is to provide a method which makes possible the measurement of a condition of the earth at the bottom of a deep well by the transmission of electrical impulses from the bottom of the well to the surface, which impulses are varied in accordance with the measurement taken at the bottom of the well, and the receiving of the impulses at the surface and the translation thereof into measurements corresponding to those taken at the bottom of the well. More specifically, the invention provides a simple and effective method and apparatus whereby such transmission and reception is made possible and practicable. To this end, the invention contemplates the utilization of the measurements of a condition in the earth's stratum being measured, to vary the frequency or duration of the electrical impulse which is being transmitted to the surface and the measurement, at the surface, of such frequency or duration and the translation thereof back into an indication of the conditions at the bottom of the well.

Another object of the invention is to provide a method and apparatus for logging which, in addition to the advantages specified above, is capable of simultaneously measuring and recording or indicating at the surface two or more separate conditions existing at the bottom of the well. To the best of my knowledge, it has never before been proposed to transmit, upon an electrical wave or series of impulses traveling through the earth structure itself, separate indications of two or more different conditions at the bottom of a well. The invention achieves this by utilizing the measure of the duration of an electrical impulse as a measure of one condition and the measure of the interval between impulses as the measure of another condition, and measuring the durations of the impulses and the intervals between the impulses at the surface so as to provide an indication or record of the conditions which were measured at the bottom of the well.

A further object of the invention is to provide an electro-responsive apparatus at the surface of the earth adapted to respond, in two or more different manners, to variations in the durations of, or polarity of, and the time intervals between a series of electrical impulses transmitted through the earth from the bottom of a well, which durations, polarities, and intervals, in turn, are determined by two or more different conditions existing at the bottom of the well.

A further object of the invention is to provide improved apparatus, including self contained impulse generating mechanism and mechanism responsive to a plurality of conditions at the bottom of a well in which the apparatus is adapted to be utilized.

A further object of the invention is to provide a receiving apparatus adapted, at the surface of the earth, to receive a faint electrical wave transmitted through the earth from the bottom of a well, to amplify said wave, and to measure the variations in frequency of said wave so as to reproduce an indication or record of the conditions existing at the bottom of the well. More specifically, it is an object of the invention to provide a receiving apparatus adapted to provide a continuous record on a strip of electro-sensitive material of two or more conditions as they exist in various strata throughout the length of a well, in combination with apparatus adapted to be utilized simultaneously during the drilling of the well to measure the two or more conditions throughout the increasing depth of the well, and to transmit the measurements to the surface in the form of electrical impulses capable of being picked up at the surface by said receiving apparatus and translated into said visual record.

Further objects and advantages of the invention will be brought out in the following part of the specification.

Referring to the drawings which are for illustrative purposes only:

Fig. 1 is a vertical sectional view through portions of a drill hole having logging apparatus installed in connection therewith;

Fig. 2 is a wiring diagram of the apparatus of the transmitting unit;

Fig. 3 is a wiring diagram of the apparatus of the receiving unit;

Fig. 4 is a comparative graph showing an impulse in the form in which it is transmitted and the same impulse as modified by the suppression effect of the earth in traveling to the surface;

Fig. 5 is a comparative graph showing the modification, at the points of transmission, by various earth formations, of the impulses transmitted by the invention;

Fig. 6 shows a section of a graph of a type produced by the invention;

Figure 7:
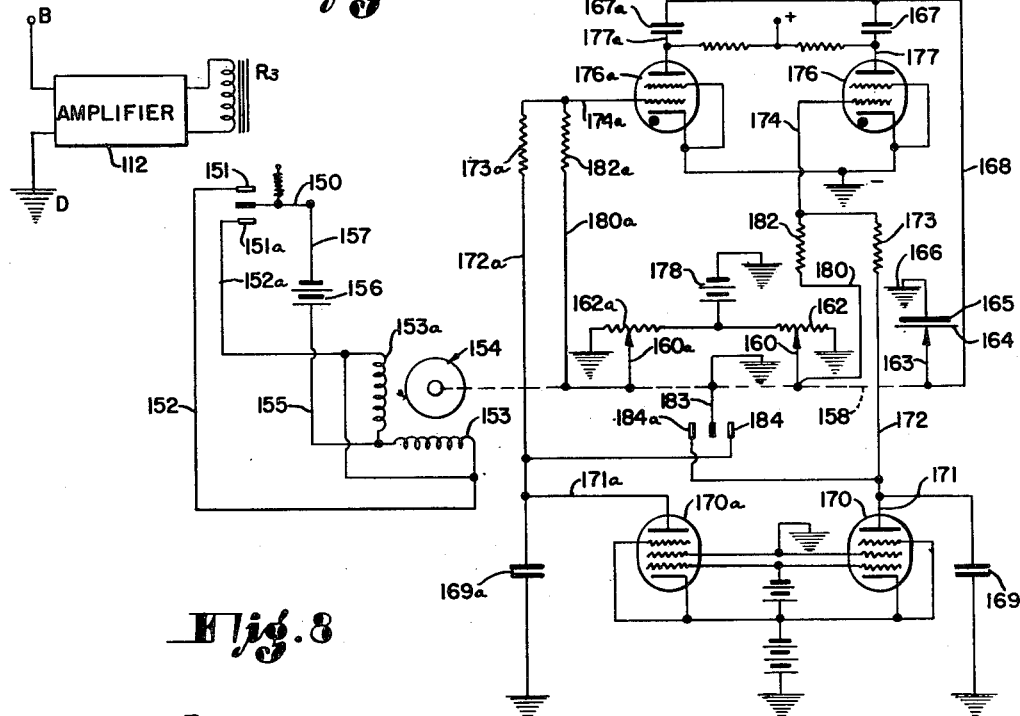
Fig. 7 is a wiring diagram of a modified form of the receiving apparatus.

As an example of one form of apparatus by which the invention may be practiced, I have shown in Figs. 1, 2 and 3 a logging system capable of continuously indicating during the operation of drilling a hole 10 for an oil well the self potential and resistivity of a measured section of earth immediately adjacent the drill bit 11 carried by the lower end of a string of drill pipe B, such as used in rotary method of well drilling wherein drilling mud, pumped down through the drill pipe, passes up through the hole and casing along the exterior of the drill pipe. Using the drill pipe B as one conductor and the earth 13 as the other, the apparatus measures a difference of electrical potential between the bottom of the hole where contact is made as indicated at A, and the average potential of the drill pipe. This potential difference is transformed into terms of time by electronic pick-up mechanism forming part of the transmitting unit 16 in the lower end of the drill pipe B, and the time period thus determined is, at the surface, transformed back into terms of the original condition by a meter 17 (e. g., a milliameter) of a transforming unit 18. This is accomplished by starting, at the end of the time period thus determined, the transmission into the earth at the point C of an electrical impulse (indicated at 19) which travels upwardly to the surface and establishes a potential difference between the drill pipe and a selected point, indicated at D, in the surface of the earth at a distance from the hole 10. This potential difference acts upon the transforming unit 18 (which is connected between the drill pipe and point D as shown) and operates to swing the needle of the meter 17 to an extent determined by the length of the immediately preceding time period during which no impulse was being transmitted. The amplitude of swing of the meter needle depends upon the quantity of electrostatic charge stored in a condenser 20 (Fig. 3) arranged to discharge into the meter 17 when the transmission of the impulse 19 commences, is thus proportional to the preceding time period during which the charge was permitted to collect on the condenser plates and, accordingly, is proportional to the self potential between the point A and the drill pipe which determined such period of time.

In the succeeding period of time, during which the impulse 19 is transmitted, a charge is stored on a condenser 21 which, when the impulse is terminated, discharges into a meter 22 to register a reading proportional to the length of such succeeding time period. Such succeeding time period is determined by the resistivity of the earth stratum between the points A and B, measured by a portion of the apparatus in the unit 16, and thus the reading on the meter 22 is directly indicative of such resistivity.

Having briefly outlined how the method is practiced, I will proceed to describe in detail the illustrative form of apparatus shown in Figs. 1, 2, and 3. The drill bit 11 may constitute an electrode for establishing electrical contact at the point A. The drill bit 11 is connected to the string of drill pipe B by a special section of drill pipe 24, which is connected to the bit 11 by a short tube section 12 and insulated therefrom by a sleeve 14 of rubber or other insulating material interposed between the tube section 12 and drill pipe section 24, the latter being covered by a sheath 25 of insulating material. A ring 191, encircling the sheath 25 intermediate the ends of the section 24, is in contact, as indicated at C, with the body of water or drilling fluid 26 which, since it fills the well around the drill pipe is normally present in the bottom of a drilled hole, so as to provide a transmitting electrode. The upper end of the transmitting unit 16 is grounded to the drill pipe B by any suitable means, such as, for example, brushes 27 attached to the casing of the transmitting unit, or simply by means of contact between the casing and the interior of the drill pipe. This establishes a grounding connection to the drill pipe B of all of the various circuits of the transmitting mechanism, which will be explained in detail hereinafter. Electrical connection of the transmitting unit with the drill bit 11 may be established by brushes 28, suitably insulated from the casing of the transmitting unit, and contacting the interior of the short drill pipe section 12 which is threaded onto the drill bit. Electrical connection to the electrode 191 is established by brushes 29 which are likewise suitably insulated from the casing of the transmitting unit. The brushes 29 engage a ring 192 connected to the ring 191 by suitable conducting member 193, the latter being insulated from the pipe section 12 by a bushing 194. The brushes 28 and 29 extend through suitable apertures or windows 30 in the casing of the transmitting unit 16. It will be understood that the transmitting unit is in the form of an elongated cartridge having a diameter sufficiently small to freely pass through the string of drill pipe and having packed therein the various batteries (e. g., dry cells), thermionic tubes, and relays, etc., which comprise the transmitting mechanism.

Referring now to Fig. 2, the measurement of earth potential involves utilization of the difference in earth potential between the point A and the drill pipe B to establish a bias on the filament of a thermionic tube 31 through a circuit including the bit electrode 11 (Fig. 1), a conductor 32, a voltage divider 33, a conductor 34, contact 35 of a relay R, movable arm 36 of the relay R, a conductor 37, filament 38, and control grid 39, which is grounded by a conductor 40 to the drill pipe B (a battery 41 provides current for heating the filament 38, and the screen grid 42 is constantly biased with a positive charge from a battery 43). The earth potential is applied as a bias on the filament controlling the electron flow from the filament to the plate 44 of the tube 31, which gradually charges a condenser 45, making the plate thereof which is connected to the tube plate 44 by a conductor 46, more negative, and making the plate thereof, which is connected to the battery 41 by a conductor 47, more positive.

The charging of the condenser 45 causes a positive bias to be established on the grid 48 of a gas triode 49, through a circuit comprising the conductor 47, a second movable switch arm 51 of the relay R, a contact 52 of the relay R, a conductor 53, the grid 48, the cathode 54, a conductor 55, a battery 56, a conductor 12 tapped to an intermediate plate of the battery 56, and the conductor 46. The positive bias thus established on the grid 48 induces a flow of current from the plate 57 to the cathode 54, and when the difference in potential between the cathode and grid reaches a predetermined voltage (for example, 90 volts), the gas within the tube will ionize and establish a conducting path from the plate 57 to the cathode 54, thence through the conductor 55, the battery 56, a conductor 60 and a limiting resistance 59, and thence through the coil 58 of a relay R' and back to the plate 57.

The energizing of the relay R', which is normally biased in open position, closes the relay to establish a circuit for reversing the relay R and a circuit for energizing a vibrator V which cooperates with condensers to form an alternating current generating means. The reversal of the relay R cuts out the earth potential measuring circuit and establishes a transmitting circuit which impresses a sustained current between the electrode C and the drill pipe. The reversal of the relay R also establishes a resistivity measuring circuit into which alternating current from the vibrator V is fed, to energize the measuring apparatus, and an electric impulse having a duration determined by this measuring circuit, is transmitted at C into the earth from the transmitting circuit. These circuits are as follows:

The vibrator is energized through a circuit including the movable arm 62 of the relay R', the relay contact 63, a conductor 64, the vibrator coil 65, a battery 66, and a conductor 67 which is grounded to the drill pipe B. When energized, the vibrator produces impulses which, by condenser action, are converted into alternating current in the generating circuit which includes the conductor 67, the battery 66, the movable vibrator arm 68, the fixed vibrator contact 69, a conductor 70, a condenser 71, conductors 32 and 72, a condenser 73, a conductor 74, the plate 75 and the filament of a rectifying tube 76, and a bleeder resistance 77 which is grounded to the drill pipe B.

The circuit for reversing the relay R includes the conductor 64, relay coil 81, conductor 82 and battery 66. Energization of the coil 81 shifts the arm 36 to the contact 83, the arm 51 to the contact 84, and a third movable arm 28 of the relay, to a contact 14. The latter connection establishes the transmitting circuit, including the conductor 78, the battery 79, and the conductor 80, which leads to the electrode C. The potential of the battery 79 is impressed between the electrode C and the drill pipe, to which the relay arm 28 is grounded, for a short interval of time determined by the resistivity measuring circuit.

Resistivity is measured by rectifying the alternating current generated by the action of the vibrator V in the rectifier 76 and applying it, through a resistance 85, a conductor 86, voltage divider 87, a conductor 88, relay contacts 83 and 36, and the conductor 37, to the filament 38 of the amplifying tube 31, thereby changing the bias on the tube. When the vibrator contacts close, the voltage of the battery 66 is impressed on the condensers 71 and 73, inducing a potential on the rectifier tube 76. When the vibrator contacts open, the condensers discharge through a resistor 50 which is shunted across the vibrator. Potential is bled from the rectifier by the resistor 77. The earth provides a resistance between the electrode A and the drill pipe B. The smaller this resistance, the greater is the drain of the vibrator current to the earth and consequently the lower the rectified voltage rectified in the tube 76 and transmitted through a resistor 85, conductor 86, voltage divider 87, conductor 88, switch contacts 83 and 36, and conductor 37 to the filament 38 of the amplifier tube 31, thereby changing the bias on the filament 38 to an extent proportional to the earth resistivity.

Thus biased, the tube 31 permits a gradual build up of charge on the condenser 45 through the charging circuit previously described. This charge is applied to the grid 90 of a second gas triode 91 through a circuit comprising the conductor 47, the relay arm 51, the contact 84, a conductor 92, the grid 90, the cathode 93, the conductor 55, the battery 56, and the conductors 12 and 46. When this bias reaches a predetermined voltage, the resistance of the tube 91 breaks down, the tube ionizes, and causes the tube 49 to deionize, thus opening the relay R', and terminating the transmitting cycle. Since the rate at which the bias on the tube 91 is built up to the break-down voltage is dependent on resistivity, the duration of the transmitted impulse is a measure of the resistivity.

The deionization of the tube 49 is effected by reducing the potential on the plate 57 to a negative quantity. The plate 106 is connected to the conductor 60 by a resistor 107. A condenser 108 is bridged between the plates 57 and 106. When the tube 49 is conducting, the potential across it is much lower than the voltage applied by the battery 56. For example, if the battery E. M. F. is 200 volts, the voltage drop through the resistor 59 and the coil 58 may be such as to place a potential of only 70 volts on the plate 57 and, consequently, on the left side of the condenser 108, while the full voltage of 200 volts is applied to the right side of the condenser. When the tube 91 ionizes, the potential on the right side of the condenser is dropped to zero and a corresponding drop will occur on the other side of the condenser, making the plate 57 negative and stopping the flow of current through the tube.

The tube 91 continues to conduct during the earth potential cycle, and is deionized when the tube 49 is ionized, in a manner similar to that described above.

Voltage dividers 33 and 87 function to adjust the initial fixed bias on the filament 38. E. M. F., for this bias, is supplied by the batteries 109.

The resistor 85 and the condenser 110 form a filter. Contacts 35 and 83 are grounded through condensers 111, which, in conjunction with the voltage dividers 33 and 87, forms a filter which, with the filter 85, 110, disposes of transient voltages such as those caused by opening and closing of the relay contacts, etc.

The limiting resistors 59 and 107 function to protect the gas triodes 49 and 91 and the battery 56 against excessive current flow under the high voltage of the battery 56.

The pulses transmitted from the bottom of the well are received by an amplifier 112, Fig. 3 (a high gain amplifier with proper filters to eliminate commercial frequencies and other undesirable currents), which amplifies them sufficiently to energize the coil 185 of the relay R''. The relay R'' has a pair of movable switch arms 113 and 114 cooperating with pairs of fixed contacts 116 and 117 and 118 and 119 respectively. The relay is biased to engage the contacts 117 and 119 during the intervals between pulses, and with these contacts engaged, the condenser 20 is charged from a pentode voltage amplifier tube 120 through a circuit, including a conductor 121, the relay, a conductor 122, the tube 120, the cathode lead 123, the B battery 124, and a conductor 125. When the transmitted pulse is received, the relay reverses, establishing a circuit through which the condenser 20 discharges into the meter 17 to give a reading commensurate with the charging time (the non-transmitting interval preceding the pulse) and thus is directly indicative of the earth potential. The condenser discharge circuit includes the conductor 121, relay contacts 113 and 116, a conductor 126, meter 17, and conductor 125. For the duration of the transmitted pulse the condenser 21 is charged from a tube 127 (similar to the tube 120) through a circuit including the conductor 128, relay contacts 114 and 118, conductor 129, the tube 127, the cathode lead 123, B battery 124 and the conductor 125.

At the end of the transmitted impulse, the relay is deenergized and reverses to its biased position, discharging condenser 21 into the meter 22 to give a reading corresponding to the duration of the pulse and thus is directly indicative of earth resistivity. This is accomplished through a discharge circuit including the conductor 128, relay contacts 114 and 119, the conductor 130, the meter 22, and the conductor 125.

Fig. 4 shows, in diagram form, a pair of oscillograms actually recorded photographically from the screen of an oscillograph and produced by a signal transmitted from a depth of over 2000 feet, the lower oscillogram representing the sustained pulse at the transmitting point, with the potential rising instantaneously, as at 131, from zero to full intensity which is continued as at 132 for the duration of the transmitting period, then instantaneously dropping back to zero as at 133. The received pulse requires, however, a substantial time interval $t$ (which at such depth may be about .06 second) to build up, as indicated at 134, to full potential, which is sustained as indicated at 135 for substantially the same period as the transmission period, and requires another interval $t'$ of about the same time as the build-up period, as indicated at 136, to decay back to zero. Oil wells are drilled in earth comprising one or more wet formations, such as water bearing sands or other moisture carrying layers of minerals. These formations therefore have a condenser effect which cooperates with the inductance and/or choke effects of the earth structure to form filters which suppress all frequencies except those within a very low range. To illustrate what occurs, I have in Fig. 4 shown time intervals $t$ and $t'$ which may be referred to as the suppression time characteristic of the formation or earth between the point of energization in the well and the surface of the earth. After the direct current flow or impulse is initiated in the well as indicated at 131 there is a delay $t$ during which time the condensers formed by the formations are being charged and the counter-inductances and choke effect of the formations are being overcome, with the result that at the surface the peak of the received wave indicated at 135 is not reached until after the suppression time or interval $t$ has elapsed, such time $t$ for the formation traversed by the 2000-foot depth of well recited in the foregoing being about $\frac{1}{16}$ of a second. As shown by an oscillograph the energizing direct current potential is discontinued in the well as indicated at 133, the oscillograph shows that it takes the time interval $t'$ for the formation condensers, restrained by the choke or self-potential effects of the formation, to discharge. Therefore, as a result of this condition, it is necessary that the frequency of the direct current impulses be not substantially greater than about ten complete cycles per second, it being understood that the term "cycle" refers to the electrical impulse and the time interval following it, or the time between successive impulses of the same polarity, regardless of whether these impulses of the same polarity are separated by intervals of reduced or zero potential, by impulses of opposite potential, or by frequencies which will be suppressed by the formations.

Fig. 5 shows a set of curves indicating how the frequency of the pulses and the intervals between pulses vary to indicate different earth conditions. The curves, designated 138, 139, 140, 141, 142, 143, 144, and 145, correspond respectively to layers of shale, fresh water, shale, dense shale formation, salt water, shale, oil and salt water. In each curve, the pulses, measuring the resistivity, are indicated at 135 while the intervals, measuring the earth potential, are indicated at 137.

Figure 8:
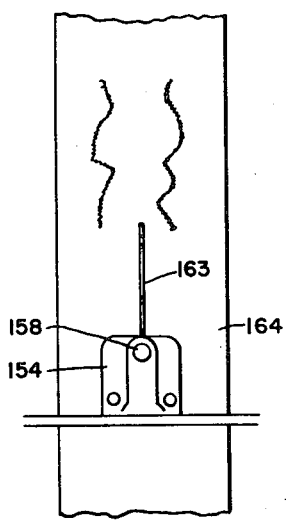
Fig. 8 shows the recording portion of the apparatus shown schematically in Fig. 7.
Figure 9:
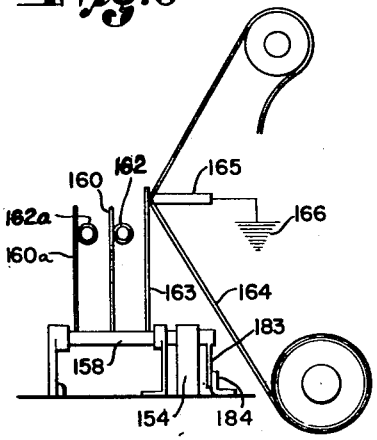
Fig. 9 is a side elevation of the mechanism shown in Fig. 8.

Fig. 6 shows a pair of curves (137a indicating earth potential and 135a indicating resistivity) plotted from a series of readings taken continuously during a drilling operation. These curves indicate low potential and low resistivity for shale, medium potential and high resistivity for fresh water, low potential and high resistivity for dense shell formation, and high potential and resistivity for oil. Such a pair of curves can be continuously recorded on a sheet by the receiving mechanism shown in Figs. 7, 8, and 9.

The permanent record apparatus includes the high gain amplifier 112, arranged to pick up transmitted pulses between the points B and D, and the relay R3, having a movable arm 150 biased to engage a contact 151 during the interval between pulses and to establish a circuit through the conductor 152, the winding 153 of a reversible motor 154, the conductor 155, the battery 156, and the conductor 157. When a pulse is received by amplifier 112, it is amplified to energize the relay R3, swinging the relay R3, swinging the relay arm 150 to engage the contact 151a and energizing the coil 153a of the motor 154, through the conductor 152a. On the shaft 158 of the motor (Fig. 9) are two potentiometer brushes 160 and 160a, in engagement with potentiometer resistors 162 and 162a. Also, on the shaft 158 is an electrode arm 163 which sweeps from side to side of a ribbon of sensitized paper 164 of the type adapted to register a mark when an electric current is passed through it (such as the paper known commercially as "Teladeltos"). On the opposite side of the paper is a stationary horizontal bar electrode 165 which is grounded, as indicated at 166 in Fig. 9.

As the arm 163 swings in opposite directions, it is adapted to receive the discharge of the condensers 167 and 167a, one side of each of which is connected to the arm by a conductor 168, and to consequently place marks on the paper 164. The spacing of these marks from the neutral longitudinal axis of the paper is determined by the amounts of the charges stored on the condensers 169 and 169a which have, during the periods of time preceding the respective swings of the arm 163, received such charges, commensurate with the respective time periods, from tubes 170 and 170a to which the condensers 169 and 169a are connected by conductors 171 and 171a. The charges on the condensers 169 and 169a are applied, through conductors 172 and 172a, resistors 173 and 173a, and conductors 174 and 174a, as a bias on the grids of gas tubes 176 and 176a, the plates of which are connected by conductors 177 and 177a to the condensers 167 and 167a.

A biasing potential is applied to resistors 162 and 162a by a battery 178. This potential is opposed, through the arms 160 and 160a, conductors 180 and 180a, and resistors 182 and 182a, to the potentials of condensers 169 and 169a respectively. As the arms 160 and 160a swing (in unison with the arm 163) they traverse the resistors 162 and 162a until they (alternately) reach points where the potentials applied from the battery 178 are equal and opposite to those stored on the condensers 169 and 169a, whereupon the tubes 176 and 176a will in turn ionize and establish conducting paths including conductor 168, through which the condensers 167 and 167a discharge to the electrode 163, marking the paper 164 at points indicative respectively of the duration of the pulses and intervals, and thus being indicative of potential and resistivity in the earth formation being logged.

As the motor 154 completes its full amplitude of swing, a brush 183 engages grounded contacts 184 and 184a in turn to short out the condensers 169a and 169 to neutralize them for the next cycle of operation.

The drive for the paper 164 is synchronized with the drill pipe so that the paper is fed at a rate proportional to the rate of movement of the drill pipe into the well.

The marks placed on the paper by the arm 163 will form curves corresponding to those shown at 135a and 137a in Fig. 6.

The above described circuit is a relaxation or trigger circuit, controllable by resistance or voltage changes. It furnishes two stable phases, and is capable of being modified so as to furnish additional stable phases.

While the specific circuit described herein provides for transmission of voltages of one polarity by a discontinuous current or series of unipolar impulses, it is to be understood that the invention may also be carried out by the use of a current of periodically reversing polarity and which may be either discontinuous or continuous. For example, the relay R could be modified so as to reverse the position of the battery 79 in the circuit at the end of each phase of operation, thereby applying an impulse of polarity opposite to that of the preceding impulse, instead of cutting out the current flow entirely.

I claim as my invention:

Apparatus for receiving a series of sustained electrical impulses of appreciable duration which vary in accordance with variations in transmitting conditions, and for translating said impulses into indications of the variations in the duration of said impulses, including: a two-position relay biased to one position in the intervals between impulses and responsive to the impulses to assume its other position, a pair of electronic tubes and a means for producing a flow of current therethrough, a pair of capacitances for storing the current received from the respective tubes, a pair of meters adapted to measure the quantity of E. M. F. stored in the respective capacitances, said relay being adapted, in one of its positions, to connect one of said capacitances to said meter for said discharge of the capacitance charge into the meter to produce a reading thereon, and to interrupt the conducting circuit of one of said tubes and, in its other position, to connect the other capacitance to the other meter for discharging an indicating current thereinto and to interrupt the conducting circuit of the other tube while reestablishing the conducting circuit of the first mentioned tube and the connection thereof to the first mentioned capacitance for charging the same.

PHILIP W. MARTIN.

REFERENCES CITED

The following references are of record in the file of this patent:

UNITED STATES PATENTS

| Number | Name | Date |
|---|---|---|
| 1,220,005 | Rogers et al. | Mar. 20, 1917 |
| 1,470,430 | Ellison | Oct. 9, 1923 |
| 1,966,224 | Sommerfeld et al. | July 10, 1934 |
| 2,018,080 | Martienssen | Oct. 22, 1935 |
| 2,138,668 | Stewart | Nov. 29, 1938 |
| 2,145,026 | Huxford | Jan. 24, 1939 |
| 2,176,758 | Borden | Oct. 17, 1939 |
| 2,192,404 | Jakosky | Mar. 5, 1940 |
| 2,295,738 | Gillbergh | Sept. 15, 1942 |
| 2,310,611 | Blondeau | Feb. 9, 1943 |
| 2,314,873 | Evjen | Mar. 30, 1943 |
| 2,336,929 | Doyle | Dec. 14, 1943 |
| 2,354,887 | Silverman et al. | Aug. 1, 1944 |
| 2,364,957 | Douglas | Dec. 12, 1944 |
| 2,371,415 | Tolson | Mar. 13, 1945 |
| 2,377,757 | Clark | June 5, 1945 |
| 2,380,520 | Hassler | July 31, 1945 |
| 2,400,170 | Silverman | May 14, 1946 |
| 2,409,559 | Haight | Oct. 15, 1946 |
| 2,419,292 | Shephard | Apr. 22, 1949 |

OTHER REFERENCES

"Geophysical Exploration," Heiland, published 1940 by Prentice-Hall, Inc., N. Y. city. See page 723.